United States Patent Office 2,727,019
Patented Dec. 13, 1955

2,727,019

N - (VINYLOXYALKYL)-IMIDAZOLIDONES AND HEXAHYDROPYRIMIDONES AND POLYMERS

Sidney Melamed, Philadelphia, Pa., assignor to Rohm & Haas Company, Philadelphia, Pa., a corporation of Delaware No Drawing. Application April 10, 1953,
Serial No. 348,105

15 Claims. (Cl. 260—79.7)

This invention relates to compounds of the structure

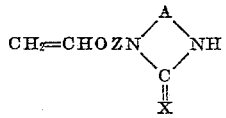

wherein X is sulfur or oxygen, A is an alkylene group of two to three carbon atoms with at least two carbon atoms between the nitrogen atoms, and Z is an alkylene chain of at least two carbon atoms or an alkylene chain of two carbon atoms having a phenyl, alicyclic hydrocarbon, vinyl, or alkyl substituent, the said alkyl substituent forming part of an alkylene group of not over 18 carbon atoms. This invention is concerned also with methods for preparing the above compounds, forming polymers thereof, and also forming copolymers with other vinylidene compounds which are copolymerizable with free radical catalysts. The invention also deals with these polymers and copolymers.

Previously known vinyl ethers have generally been polymerized with acid catalysts and have not been polymerizable in a practical way with free radical catalysts. It has also been noted that the presence of a basic group such as an amino substituent prevents polymerization with a catalytic amount of acid. In contrast to previously known vinyl ethers the ethers of this invention contain a nitrogenous, reactive function and are polymerizable with free radical catalysts. The ethers of this invention are thus converted to high polymers. These ethers differ from N-vinyl compounds in being far less critical as to conditions of polymerization and the polymers therefrom are stable under both acidic and alkaline conditions. The compounds of this invention are characterized by both a vinyl-ether group and a nitrogen-containing group, these groups being separated and yet each influencing the other.

The N-vinyloxyalkyl imidazolidones and hexahydropyrimidones are formed by reacting a hydroxyalkylaminoalkylamine with acetylene to form a vinyloxyalkylaminoalkylamine, CH₂=CHOZNHANH₂, which is then reacted to form the desired cyclic compound, as by reacting with urea with evolution of ammonia. Alternatively, a hydroxyalkylaminoalkylamine, HOZNHANH₂, is reacted with urea to form an N-hydroxylalkyl imidazolidone or hexahydropyrimidone, which is then reacted with acetylene to form the desired vinyl ether.

The reaction with urea is effected by mixing one of the above types of diamines with an approximately equimolecular weight of urea and heating the mixture at a sufficient temperature to evolve ammonia. Temperatures between about 110° and 200° C. are used. Usually the reaction runs in two temperature stages. Initial evolution of ammonia is obtained at 110°–150° C. The temperature is then raised to 150°–200° C. to complete the evolution of ammonia.

Instead of reacting one of the above diamines with urea the formation of the cyclic compounds may be effected by reacting either a hydroxyalkylaminoalkylamine or a vinyloxyalkylaminoalkylamine with a lower alkyl carbonate and displacing a lower alkanol. Dimethyl carbonate is particularly suitable for this reaction, but in place thereof diethyl, dipropyl, or dibutyl carbonates may be used. An alkali metal alkoxide is used as catalyst in this reaction, sodium methylate being very convenient. Temperatures vary from 110° to 200° C., completion of the reaction with evolution of an alcohol being effected as described above with urea.

Vinylation of either type of hydroxy compound is accomplished by reacting a said hydroxy compound,

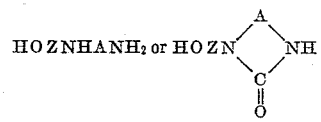

with acetylene under pressures of 100 to 500 pounds per square inch at 120°–180° C. in the presence of a strongly basic catalyst, such as potassium metal, potassium hydroxide, or sodium metal. The vinyl ether is then purified by distillation or by crystallization or other conventional procedure.

Hydroxy compounds are obtainable, as is known, by the reaction of one mole of a 1,2-alkyleneoxide, or an oxirane, or a 1,2-cyclic ether on one mole or more of ethylenediamine, trimethylenediamine, or 1,2-diaminopropane. The two reactants are mixed, desirably in a solvent, including dioxane, water, or a hydrocarbon or preferably excess amine and reacted between 20° and 100° C. There may thus be reacted ethylene oxide, propylene oxide, styrene oxide, butadiene monoxide, or any 1,2-cyclic ether $\overline{\text{RCHCH}_2\text{—O}}$ where R is phenyl, cyclohexenyl, vinyl, methyl, ethyl, pentyl, octyl, dodecyl, hexadecyl, or the like. Likewise, trimethylene oxide may be reacted, yielding a γ-hydroxypropyl diamine. The group R may become a cyclohexyl group by reduction of the phenyl group obtained by reaction with styrene oxide.

Another route for reacting hydroxyalkylaminoalkylamines has been described. It comprises reacting a hydroxyalkylamine, H₂NZOH, with one mole of acrylonitrile to form the N-cyanoethyl derivative and reducing this to the diamine. In this way compounds of the structure H₂NCH₂CH₂CH₂NHZOH result. In this case Z may be an alkylene chain of two or more carbon atoms ten carbon atoms being thus readily available in this group.

In a comparable way an aminoalcohol is reacted with formaldehyde and hydrogen cyanide to give N-hydroxyalkylaminoacetonitriles which are then reduced to H₂NCH₂CH₂NHZOH.

Some typical hydroxyalkylaminoalkylamines are

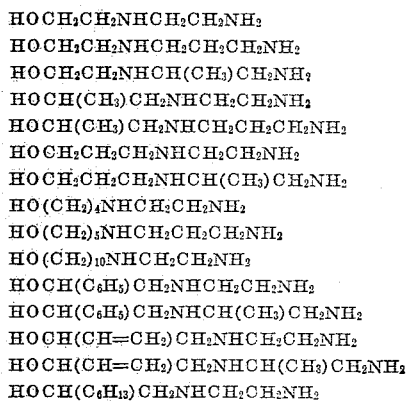

HOCH($C_8H_{17}$)CH$_2$NHCH(CH$_3$)CH$_2$NH$_2$
HOCH($C_{16}H_{33}$)CH$_2$NHCH$_2$CH$_2$NH$_2$

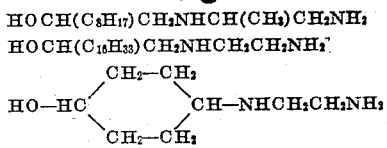

It should also be pointed out that compounds of the structure HOZNHANHR may be converted to the 1-(vinyloxyalkyl)-3-substituted-2-imidazolidones or hexahydropyrimidones, R being a substituent such as lower alkyl, in particular a methyl group. These compounds, however, lack an active hydrogen.

Any of the above or equivalent hydroxyalkylaminoalkylamines may be used as a starting material. For preparation of the compounds in which X is oxygen the order of the reaction steps is not important, the first step being vinylation or cyclization. For preparation of the sulfur analogues it is necessary to convert the hydroxyalkylaminoalkylamines to the vinyl ether by reaction with acetylene and then react the ether with thiourea.

An alternative method for preparing the thiones is based on first reacting a hydroxyalkylaminoalkylamine with acetylene to form the vinyl ether thereof, then reacting the ether with an equivalent weight of a tert.-alkylisothiocyanate to form a thiourea, and decomposing this thiourea by heating it at about 180°–225° C. with evolution of tert.-alkylamine and formation of a thione. Reduced pressure may be used in taking off the tert.-alkylamine. The solid product left is desirably purified by such steps as extraction, charcoaling, and/or crystallization.

Vinyloxyalkyl imidazolidones or hexahydropyrimidones or their sulfur analogues are useful as modifiers of urea-formaldehyde or melamine-formaldehyde condensates. Advantageously 1% to 30% of urea or melamine may be replaced with one or more of these vinyloxyalkyl imidazolidones or hexahydropyrimidones and the mixture treated with a formaldehyde or a revertible polymer thereof. The resulting condensates are of high stability on storage. Subsequent acidification, as from the catalyst, gives extremely rapid condensation at low to moderate temperatures. The resulting polymeric products possess increased water-resistance in adhesive formulations.

A most important application of the above ethers is for the preparation of polymers and copolymers. Although the common vinyl ethers, including alkyl vinyl ethers and the like, require acid catalysts for polymerization, the ethers of this invention are polymerized with free radical catalysts, acidic catalysts being in fact undesirable. The polymers of these ethers are of high molecular size and yet are soluble in various common solvents. The polymers are stable under normal and prolonged storage, unlike many other nitrogenous polymers. This also holds true for the methylol derivatives of the ethers of this invention.

Homopolymers and mixed polymers of the N-(vinyloxyalkyl) imidazolidones and hexahydropyrimidones are formed under the influence of azo free radical catalysts. These azo catalysts are compounds in which the —N=N— group is attached to aliphatic carbon atoms, at least one of which is tertiary. One of the carbon atoms bonded to the tertiary carbon atom has its remaining valences satisfied by at least one of the elements oxygen or nitrogen. Typical azo catalysts are azodiisobutyronitrile, azodiisobutyramide, dimethyl, diethyl, or dibutyl azodiisobutyrate, azobis($\alpha,\gamma$-dimethylvaleronitrile), azobis($\alpha$-methylbutyronitrile), azobis($\alpha$-methylvaleronitrile), dimethyl, diethyl, or dibutyl azobismethylvalerate, and the like. This class of catalysts is also useful in preparing copolymers.

There may likewise be used peroxidic catalysts for preparing copolymers of a vinyloxyalkyl imidazolidone or hexahydropyrimidone, including the corresponding thiones, and at least one other vinylidene compound which is copolymerizable with free radical catalysts. Typical organic peroxides are benzoyl peroxide, caproyl peroxide, acetyl peroxide, lauroyl peroxide, cumene peroxide, methyl ethyl ketone peroxide, tert.-butyl hydroperoxide, and butyl perbenzoate.

In emulsion polymerization and in aqueous solutions there may be used hydrogen peroxide, ammonium persulfate, sodium persulfate, or potassium persulfate, or other inorganic peroxidic catalyst. These peroxide catalysts are best used in redox systems, that is in conjunction with a reducing compound such as sodium sulfite, bisulfite, metabisulfite, or hydrosulfite, or hydrazine. Metal activators may be used, if so desired. Regulators such as mercaptoethanol may be used in emulsion polymerization or in polymerizations in bulk or solution.

Polymerization and copolymerization are generally accomplished between 50° and 150° C. Azo catalysts are best used between 50° and 90° C., while peroxidic catalysts are usually most effective between 90° and 150° C. In emulsion polymerizations starting temperatures may be as low as 10°–15° C., but the temperature rises as reaction proceeds, 50° to 100° C. being commonly employed to complete polymerizations.

Additional details regarding the compounds of this invention are given in the following examples, which illustrate methods of preparation and show a few typical applications of monomeric and polymeric products. Parts shown in the examples are by weight.

EXAMPLE 1

Vinyloxyethylethylenediamine, prepared by the reaction of acetylene on N-hydroxyethylethylenediamine at about 150° C. and 400 pounds total pressure in the presence of potassium hydroxide, is mixed in an amount of 65 parts with 33 parts of urea and two parts of potassium cyanide. The mixture is heated and stirred. At 113° C. the mixture begins to become clear and at 119° C. evolution of ammonia is evident. With the temperature at 120° to 140° C. a molar proportion of ammonia is taken off. The temperature is gradually increased to 200° C. with evolution of a second molar proportion of ammonia. The fusion product is dissolved in 225 parts of hot ethyl acetate. The solution is filtered hot. The filtrate is cooled with formation of crystals, which are separated by filtering and recrystallizing. There is obtained a pure product, 2-(2-ketoimidazolidyl)ethyl vinyl ether, melting at 81°–82° C., amounting to 39 parts, and containing by analysis 53.75% of carbon, 7.57% of hydrogen, and 17.73% of nitrogen. The corresponding theoretical values are 53.8%, 7.69%, and 17.95%. This compound is soluble in water and in alcohols.

It is useful as a modifier of urea-formaldehyde and melamine-formaldehyde condensates. For example, replacement of 20% of the urea in a condensate of 1.0 mole of urea with 1.3 moles of formaldehyde gives a soluble condensation product which has much improved storage stability over the unmodified urea-formaldehyde condensate. Yet on subsequent acidification of the condensate in acid catalyzed applications, as on textiles, the modified condensate undergoes extremely rapid condensation at moderate temperatures.

EXAMPLE 2

There are mixed in a reaction vessel 90 parts of dry dimethyl carbonate, 130 parts of vinyloxyethylethylenediamine, and one part of sodium methoxide. The mixture is heated. At about 122° C. evolution of methanol begins. The temperature is raised with evolution of a molar proportion of methanol between 122° and 140° C. Heating is continued and between 180° and 200° C. about another molar proportion of methanol is given off. The residue is taken up in ethyl acetate and crystallized twice to give 80 parts by weight of pure 2-

(2-ketoimidazolidyl)ethyl vinyl ether, melting at 81°–82° C.

A most important use of this product and related materials is in preparation of polymers. While usual vinyl ethers are not practically polymerized with free radical catalysts and while amino or amido substituted vinyl ethers can be catalyzed with more than equivalent amounts of acidic catalysts to polymers of low molecular weight, surprisingly the ketoimidazolidylalkyl vinyl ethers are polymerized with small amounts of azo catalysts to stable, soluble polymers.

EXAMPLE 3

A reaction vessel is charged with 100 parts of 2-(2-ketoimidazolidyl)ethyl vinyl ether and 100 parts of water. The charge is stirred to ensure solution and heated to 75° C., whereupon dimethyl azodiisobutyrate is added in an amount of two parts. An exothermal reaction ensues, the temperature being then controlled between 75° and 80° C. and maintained at about this level for 16 hours. A viscous solution is formed (E+ on the Gardner-Holdt scale). This solution is poured into about 1800 parts of acetone with precipitation of polymer. This is separated and dried in vacuo to yield 90 parts of a white, crystalline-appearing solid. This purified polymer is soluble in water and is stable over a pH range from 3 to 10 at temperatures below 40° C.

The above polymer has a molecular weight of approximately 50,000. With variations in solvent, catalyst ratio, and the absence or presence of modifiers, such as amines or mercaptans, variations in molecular weight may be had from 1,000 to 100,000.

In place of the dimethyl azodiisobutyrate used above there may be used azodiisobutyronitrile or other azo free radical catalyst. In place of water there may be used methanol, dimethylformamide, or ethyl acetate. The polymers obtained therein have varied from 5,000 to 20,000 in molecular size.

Polymers may also be prepared by polymerization of the monomer in bulk, i. e. without solvent. Polymerization may also be effected by suspension polymerization, wherein the monomer is dispersed or suspended in a non-solvent medium. The medium has a function of providing good heat transfer.

The water-soluble polymers are useful as adhesives and coatings. In one type of application they are applied from solution to textile fibers as sizes and finishing agents. They are particularly effective as warp sizes. For example, an aqueous 3.75% solution of the above polymer is applied to nylon and Dacron spun staple yarns in a slasher, wherein the size-box temperature is 80° F. The yarns are then passed through a drier at 350°–380° F., about 30 seconds being required for this operation and are left coated with a thin, protective film. The yarns are conditioned at 70° F. and 65% relative humidity for 24 hours and tested for weaving efficiency rating (W. E. R.) with a Walker abrader. The results are summarized in the following table:

Table
WEAVING EFFICIENCY RATINGS

| Size | On Nylon | On Dacron |
|---|---|---|
| Control | 2 | 0 |
| Resin II | 6 | 3 |
| Polymer (Example 3) | >20 | >20 |

Resin II is a commercially used polyacrylic sizing. With the polymer of Example 3 there is no balling or fuzzing of the fibers. The polymer is thus shown unusually efficient as a size. Yet it does not stiffen the yarn as do the conventional sizes, starch, polyacrylates, or polymethacrylates. The polymer remains water-soluble and can be removed by washing.

In connection with the above application and other like it comment should be made that the solutions of polymer can be made in water from the usual town and city water supplies without softening or adjustment. The solutions are stable, even with wide variations in pH.

The polymers are taken up from solution on cellulose fibers. They may thus be used in the paper-making machine to improve the properties of paper, including wet-strength. The polymers remain soluble even in the presence of alum. Hence, no gels form with attendant gumming of the screen. When applied at 2% polymer solids on pulp solids, these polymers increase both wet and dry strengths of paper several fold. The polymers may also be utilized in paper manufacture in the form of their methylol derivatives.

EXAMPLE 4

A solution of 90 parts of a polyvinyl 2-(2-ketoimidazolidyl)ethyl ether is taken up in 500 parts of water. Thereto is added 95 parts of aqueous 37% formaldehyde solution adjusted to pH 8.5. This mixture is diluted with 387 parts of water, adjusted with a little sodium hydroxide solution to a pH of 8.5, and heated at 75° C. for an hour. The resultant solution contains 5% of the methylol polymer and 1.5% of free formaldehyde. It is stable at 25° C. for some months and at 60° C. for at least a month.

A solution of this methylol polymer is added to the beater end of a paper-making machine to supply 0.5% of this polymer on the weight of the unbleached kraft pulp present. The pulp is adjusted with alum to pH 4.0 and paper is formed. The dried sheet then has a wet tensile strength of 8.0 lbs./inch and a dry tensile strength of 29 lbs./inch. To reach these values with urea-formaldehyde or melamine-formaldehyde resins requires 2% to 4% resin. Control, untreated sheets, have strengths of 0.2–0.6 lb./inch and 19 lbs./inch, respectively.

The methylol derivatives are also useful for stabilizing fabrics from wool or rayon. When applied to wool at 1% to 2%, catalyzed with ammonium chloride or oxalic acid, and heated at 240°–270° F. for 10 to 20 minutes, wash-fast, shrink-resistance is obtained.

The polymers and their methylol derivatives may be applied to leather to impart fullness, a desirable degree of stiffening, and improved resistance to water. Another application of these materials is their incorporation in viscose or cellulose acetate dopes from which fibers or films are made to improve strengths and resistance to solvents.

EXAMPLE 5

Hydroxyethylaminopropylamine is prepared by reacting acrylonitrile and ethanolamine to form 3-(2-hydroxyethylamino)propionitrile (cf. J. Org. Chem. 10, 243), hydrogenating this compound and purifying it by distillation. The distilled product is treated with 5% of potassium hydroxide, heated to 150° C., and reacted with acetylene at 300 lbs. pressure. The resulting vinyl ether is isolated by distilling at 90°–100° C./8 mm. in good yield as a colorless oil.

There are mixed 144 parts of the above aminopropylaminoethyl vinyl ether and 62 parts of dry urea. The mixture is stirred and heated. Evolution of ammonia begins at 115° C. and continues as the temperature is raised to about 200° C. over a four hour period. The resultant fused product is dissolved in hot ethyl acetate. The solution is filtered and the filtrate is cooled to cause separation of product. This is separated and dried to give 85 parts of 1-(2-vinyloxyethyl)-2-hexahydropyrimidone. The nitrogen content determined by analysis is 16.5%. The theoretical value is 16.3%. This product has the formula

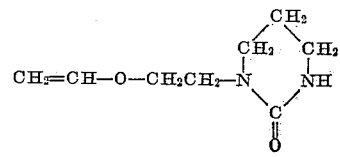

It is soluble in water and in lower alcohols. It forms polymers by the method described in Example 3.

In the same way 3-aminopropanol can be reacted with acrylonitrile to form 3-(3-hydroxypropyl)aminopropionitrile, which is hydrogenated to hydroxypropylaminopropylamine, which is in turn reacted with acetylene to yield 3-(3-aminopropylamino)propyl vinyl ether, distilling at 115°–125° C./8 mm.

There are mixed 79 parts of this vinyl ether and 30 parts of urea. The mixture is stirred and heated with evolution of one molar proportion of ammonia up to 140° C. and another such proportion up to 200° C. There remains a waxy solid which contains 15.7% of nitrogen and which is essentially 1-(3-vinyloxypropyl)-2-hexahydropyrimidone, for which the theoretical nitrogen content is 15.2%. The crude product may be used as such or it may be purified, if desired, from water or mixtures of ethanol and water. It is less soluble in water than the related 1-(2-vinyloxyethyl)-2-imidazolidone. The structure of the product is as follows:

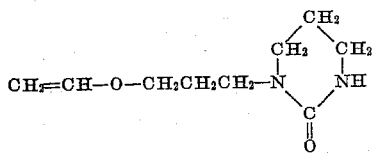

In a similar manner 1-(2-vinyloxypropyl)-2-imidazolidone is prepared from 1-(2-aminoethylamino)-2-propyl vinyl ether and urea. The requisite aminoalcohol, 1-(2-aminoethylamino)-2-propanol, is obtained by adding one mole of propylene oxide to ethylenediamine in the presence of excess diamine. The desired product is isolated by distillation. Vinylation is accomplished by reacting acetylene therewith in the presence of 5% by weight of potassium metal. The crude product obtained from the fusion with urea is a low melting solid which is soluble in water and contains 16.8% of nitrogen. This compound has the following structural formula:

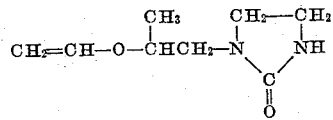

EXAMPLE 6

Styrene oxide is carefully added to excess ethylenediamine. The resulting mixture is heated at 80° C. for an hour and distilled to give 1-phenyl-2-(2-aminoethyl)-ethanol. This is reacted with acetylene under pressure at about 150° C. in the presence of potassium metal. The product is N-(2-phenyl-2-vinyloxyethyl)ethylenediamine.

There are mixed 41 parts of this product and 12 parts of urea. The mixture is heated gradually to 200° C. with evolution of approximately two equivalents of ammonia. The fused product is recrystallized from a water-ethanol mixture. The crystals correspond in composition to 1-(2-phenyl-2-vinyloxyethyl)-2-imidazolidone. This compound is relatively insoluble in water, but is soluble in various organic solvents.

A solvent solution is prepared and treated with an octylphenoxypolyethoxyethanol and then applied in an aqueous spray to bean plants infested with aphids. At 1:100 dilution a kill of over 90% is obtained.

The above compound is readily polymerized as above under the influence of dimethyl azodiisobutyrate. The polymer is soluble in alcohols and lacquer solvents and can be used to form films from these solutions. A solution in butanol may be treated with formaldehyde, first at a pH of 8.9 and then at pH's of 5 to 3. There is formed the butoxymethyl derivative. When this product is catalyzed with butyl acid phthalate, applied to plates to form films, and baked at 150° C. for 30 minutes, a hard, solvent-resistant coating is obtained.

EXAMPLE 7

The above 1-phenyl-2-(2-aminoethylamino)ethanol is treated with a palladium catalyst and reacted with hydrogen to give 1-cyclohexyl-2-(2-aminoethylamino)ethanol. This is vinylated as above and the vinyl ether is isolated as a colorless oil. There are mixed 106 parts of N-(2-cyclohexyl-2-vinyloxyethyl)ethylenediamine and 30 parts of urea. The mixture is slowly heated to 200° C. with evolution of ammonia to give the compound

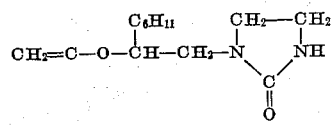

Substitution of an equivalent amount of thiourea for the above urea gives the corresponding 1-(2-cyclohexyl-2-vinyloxyethyl)-2-thioimidazolidone as a dark brown, resinous oil which contains nearly the theoretical amounts of nitrogen and sulfur. This compound at 1% concentration inhibits completely the germination of spores of *Sclerotinia fructicola*.

In place of styrene oxide above there may be used butadiene monoxide. This reacts with ethylenediamine to give N-(2-hydroxy-3-butenyl)ethylenediamine. Subsequent vinylation gives the vinyl ether, which is then reacted with a molar proportion of dimethyl carbonate in the presence of a little sodium methoxide. The product, 1-(2-vinyl-2-vinyloxyethyl)-2-imidazolidone, is a very viscous oil which is very difficult to purify. It has the structure

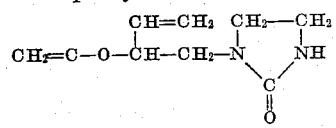

It is active as a contact insecticide against aphids and scale insects.

In an interesting variation of the alkylene chain between oxygen and nitrogen the chain may be part of a cycle. This structure occurs in 1-(4-vinyloxycyclohexyl)-2-imidazolidone, which is a white solid soluble in alcohols and ethyl acetate. This compound can be made by starting with 4-aminocyclohexanol, treating this with glycolonitrile (or hydrogen cyanide and formaldehyde) to give 4-hydroxycyclohexylaminoacetonitrile, which is then hydrogenated in liquid ammonia to give the amine, reacting this hydroxyamine with acetylene to give a vinyl ether, and heating this ether with a molar proportion of urea with evolution of ammonia. The product is 1-(4-vinyloxycyclohexyl)-2-imidazolidone. This compound is particularly useful in forming copolymers with alkyl acrylates by emulsion polymerization. The resultant dispersed copolymers are effective stabilizing agents for woolen cloth.

The homopolymer of the above compound is obtained in good yield in dimethylformamide solution. The polymer is soluble in alcohols. An alcoholic solution is reacted with formaldehyde to give the methylol derivative, which on careful acidification gives the alkoxymethyl derivative. This is a useful polymer for addition to cellulose acetate dopes from which filaments and films are made. The alkoxymethyl derivatives are also of interest for coatings and in baking enamel formulations. The baked films are tough and extremely solvent-resistant when acid-catalyzed and cured.

EXAMPLE 8

There are mixed 130 parts of vinyloxyethylethylenediamine and 76 parts of thiourea. The mixture is stirred and carefully heated. When the temperature of the mixture reaches about 120° C., evolution of ammonia occurs. As the temperature is gradually increased, ammonia continues to be evolved and an unidentified sulfur compound is given off in small amounts. The temperature is carried to 200° C. The residual product is a dark, viscous material which, when cooled, remains semi-solid. It is not readily purified. Yet this material is chiefly N-(2-vinyloxyethyl)-2-thioimidazolidone. The crude material contains by analysis 15.5% of nitrogen and 17.3% of sulfur, thus corresponding sufficiently with the theoretical values 16.2% and 18.6%, respectively, to confirm the nature of the primary product.

This compound is also obtained by the following procedure. Vinyloxyethylethylenediamine is treated with an equivalent weight of tert.-octylisothiocyanate in benzene solution at 25° C. A mildly exothermic reaction occurs. The benzene solution is then heated under reflux for a half hour and concentrated to a residue, which is vinyloxyethylaminoethyl-tert.-octyl thiourea. This material is heated to 200° C. in vacuo with evolution of tert.-octylamine. The residue is a dark, low melting solid which is chiefly N-(vinyloxyethyl)-2-thioimidazolidone.

This compound is a toxicant against soft bodied insects. Against the black bean aphid on bean plants it gives kills of 60% to 80% when applied thereto in a spray at 1:400. One per cent solutions of this product inhibit germination of spores of Macrosporium sarcinaeforme and Sclerotinia fructicola in standard fungitoxicity tests.

Vinyloxyethyl-2-thioimidazolidone is readily polymerized in bulk with about 0.5 to 2% of dimethyl azodiisobutyrate at 75° C. It may also be polymerized in solution, as in dimethylformamide.

Copolymers of the vinyloxyalkyl imidazolidones or hexahydropyrimidones and another vinylidene compound which is polymerizable with a free radical catalyst can be readily prepared, as has been indicated above. Typical vinylidene compounds include acrylic acid, methacrylic acid, acrylamide, methacrylamide, N-substituted acrylamide and methacrylamide, such as the N-methyl or N-benzyl amides, esters of acrylic or methacrylic acid, such as the methyl, ethyl, butyl, amyl, octyl, dodecyl, dodecyl, octadecyl, methoxyetheyl, phenoxyethyl, ethoxyethyl, cyclohexyl, benzyl, tetrahydrofurfuryl, oleyl, and nitroethyl, alkyl itaconates, vinyl esters, such as the acetate, propionate, butyrate, and laurate, vinyl ethers other than those of this invention, allyl esters, such as the acetate and butyrate, styrene, methylstyrenes, and vinylpyridine, as typical examples of monovinylidene compounds which form soluble copolymers. Polyvinylidene compounds can also be used as comonomers, such as allyl acrylate, vinyloxyethyl acrylate, ethylene diacrylate, or the comparable methacrylates, divinylbenzene, diallyl phthalate, etc. These lead to cross-linking and insolubilizing of the interpolymers, an effect which is sometimes desired. Some typical preparations of copolymers follow.

EXAMPLE 9

A solution of 79 parts of 2-ketoimidazolidylethyl vinyl ether in 1540 parts of ethoxyethyl acetate is heated to 75° C. with stirring. Thereto is slowly added with stirring while the temperature is kept at 75°–80° C. a solution of 2.5 parts of azodiisobutyronitrile in 950 parts of methyl methacrylate. After all of the methacrylate has been added, the solution is heated at 75° C. for three hours. At the end of both the first and second hours portions of 0.5 part each of azodiisobutyronitrile are added. There results a clear, colorless solution of copolymer. At a 38.3% solids content it has a Gardner-Holdt viscosity of X+. Films formed on glass plates with a 25 mil. filmograph are baked at 300° F. for 30 minutes. The resulting films have a Kohinoar hardness of 4H, but are soluble in ethoxyethyl acetate. When the copolymer solution is treated with a 20% solution of formaldehyde in butanol and 1% of p-toluenesulfonic acid, filmed, and baked as above, the films have a hardness of 7H and after being soaked in ethoxyethyl acetate for 24 hours still have a hardness of 3H. The catalyzed resin solution, however, shows no increase in viscosity even after six months' storage at 70°–80° F.

This solution can be pigmented with titanium dioxide and other pigments to give an enamel. Baked films formed by spraying the enamel on steel plates are completely resistant to soap and hot water for 300 to 600 hours.

EXAMPLE 10

There is prepared a solution of 10 parts of vinyloxyethyl-2-imidazolidone, 10 parts of hydroxyethyl vinyl ether, and 20 parts of water. This solution is catalyzed with two parts of azodiisobutyramide and heated under nitrogen at 75° C. for 16 hours. A viscous solution of copolymer results. This copolymer is useful as a water-soluble size and adhesive.

EXAMPLE 11

There are mixed together with stirring 10 parts of vinyloxypropyl-2-hexahydropyrimidone, 80 parts of methyl acrylate, 10 parts of butyl acrylate, and 300 parts of an aqueous 4% solution of an octylphenoxypolyethoxyethanol as emulsifying agent. The mixture is blanketed with nitrogen and treated with 0.2 part of ammonium persulfate and 0.2 part of sodium hydrosulfite. The mixture is heated to about 35° C. and a few parts per million of ferrous sulfate is added. An exothermic reaction occurs with formation of a dispersion of copolymer. This is useful as a textile finishing agent. It is particularly useful on wool for stabilizing purposes. If desired, woolen fabric impregnated therewith may be treated with formaldehyde solution and cured to give a permanent finish.

Similar copolymers may be formed from other acrylates, from methacrylates, or from vinyl esters. These dispersions are of interest for imparting protective coatings to asbestos shingles, paper, leather, or wood.

By a similar procedure copolymers with acrylonitrile may be prepared containing as much as 20% of one of the vinyl ethers of this invention. Such copolymers may be readily spun into fibers or formed into films. These copolymers exhibit improved solubility in typical polyacrylonitrile solvents.

Several types of interpolymers may be recognized. There is the situation where some variation of the properties of a homopolymer of a vinloxyalkyl imidazolidone or hexahydropyrimidone is desired. Here there will be used from about 1% to 50% of another vinylidene compound which is polymerizable with a free radical catalyst or a mixture of such compounds. Often 1% to 20% of one or more of these latter compounds is sufficient for this purpose. A second important class is that in which 1% to 50% of one or more of the compounds of this invention are used to impart new properties in the interpolymer. The presence of even a per cent or more of the cyclic nitrogen group from the compounds of this invention is sufficient in many cases to supply a second stage reactivity.

When the chief comonomer is a compound of this invention, copolymerization is best accomplished with an azo free radical catalyst. With increasing amounts of another kind of comonomer peroxidic catalysts become more effective. In any case free radical catalysts are used to convert the monomers of this invention into valuable polymers and copolymers.

I claim:

1. A compound of the structure

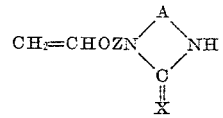

wherein X is selected from the class consisting of oxygen and sulfur, A is an alkylene group of two to three carbon atoms at least two of which occur between the nitrogen atoms, and Z is an alkylene chain of at least two carbon atoms between oxygen and nitrogen, this carbon chain being at least a part of a hydrocarbon group of the class consisting of alkylene groups of not over 18 carbon atoms and phenyl-, vinyl-, and cyclohexyl substituted ethylene groups.

2. An addition polymer of a compound of claim 1.

3. An addition copolymer of a compound of claim 1 and another monovinylidene compound which is copolymerizable therewith by a free radical catalyst.

4. An addition copolymer of claim 3 in which the vinylidene compound is a monovinylidene compound.

5. A compound of the structure

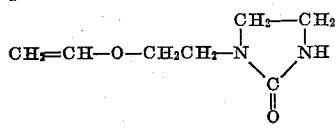

6. An addition polymer of the compound

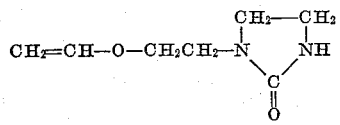

7. An addition copolymer of the compound

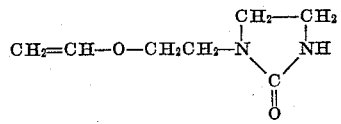

and another monovinylidene compound which is copolymerizable therewith by a free radical catalyst.

8. A compound of the structure

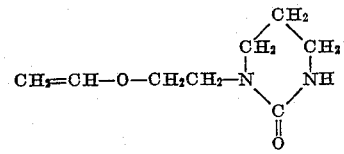

9. An addition polymer of a compound of the structure

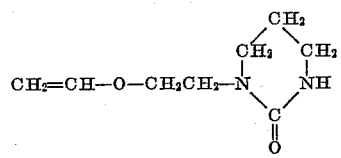

10. An addition copolymer of a compound of the structure

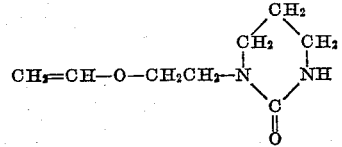

and another monovinylidene compound which is copolymerizable therewith by a free radical catalyst.

11. A compound of the structure

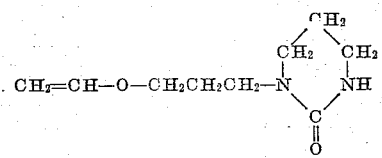

12. An addition polymer of a compound of the structure

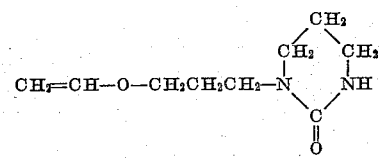

13. An addition copolymer of a compound of the structure

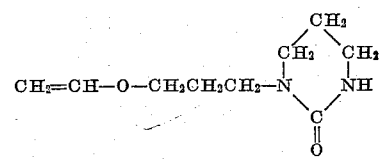

and another monovinylidene compound which is copolymerizable therewith by a free radical catalyst.

14. A compound of the structure

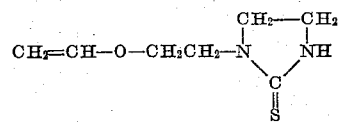

15. An addition polymer of a compound of the structure

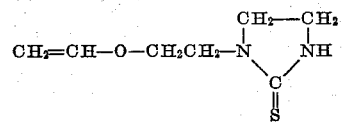

References Cited in the file of this patent

UNITED STATES PATENTS

| | | |
|---|---|---|
| 2,541,152 | Cairns | Feb. 13, 1951 |
| 2,643,990 | Ham | June 30, 1953 |